(12) United States Patent
Fujii et al.

(10) Patent No.: US 6,372,324 B1
(45) Date of Patent: Apr. 16, 2002

(54) SOFT TRANSPARENT POLYETHYLENE RESIN SHEET AND PROCESS FOR PRODUCING THE SAME

(75) Inventors: Atsushi Fujii; Tohru Yukumoto; Kenichi Fujiwara; Tomohiro Nagao, all of Himejii (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/380,356
(22) PCT Filed: Feb. 26, 1998
(86) PCT No.: PCT/JP98/00818
 § 371 Date: Aug. 27, 1999
 § 102(e) Date: Aug. 27, 1999
(87) PCT Pub. No.: WO98/38022
 PCT Pub. Date: Sep. 3, 1998

(30) Foreign Application Priority Data

Feb. 28, 1997 (JP) ............................... 9-045868

(51) Int. Cl.[7] .............................................. B32B 27/32
(52) U.S. Cl. .................. 428/141; 428/332; 428/338; 428/500; 428/523; 428/522; 428/521
(58) Field of Search ................. 428/141, 332, 428/338, 500, 523, 522, 521

(56) References Cited

U.S. PATENT DOCUMENTS 5,852,152 A * 12/1998 Walton et al. ............ 526/348.1

FOREIGN PATENT DOCUMENTS

| EP | 0 687 545 A1 | 12/1995 |
|---|---|---|
| EP | 0 803 340 A2 | 10/1997 |
| GB | 1 417 970 | 12/1975 |
| JP | 3-168224 | 7/1991 |
| JP | 5-77371 | 3/1993 |
| JP | 06-170919 | 6/1994 |
| JP | 6-218892 | 8/1994 |
| JP | 7-171849 | 7/1995 |
| JP | 07-186244 | 7/1995 |
| JP | 7-119290 | 12/1995 |
| JP | 08-156073 | 6/1996 |

* cited by examiner

Primary Examiner—William P. Watkins, III
(74) Attorney, Agent, or Firm—Flynn, Thiel, Boutell & Tanis, P.C.

(57) ABSTRACT

A polyethylene type soft transparent resin sheet according to the present invention includes a layer made of a polyethylene resin and has the following characteristics: (a) tensile modulus of 20 to 1000 MPa; (b) number of foreign substances having a refractivity different from the amorphous resin composition occupying a major part of the volume fraction of the sheet at any cross section of the sheet is less than or the same as $500/mm^2$ and the average length of the foreign substance being less than or the same as 10 $\mu$m; and (c) the surface roughness Ra of at least one surface is less than or the same as 0.2 $\mu$m. The polyethylene type resin is a copolymer of ethylene and a polar group substituted ethylene such as ethylene-vinyl acetate copolymer, ethylene-ethylacrylate copolymer and so on.

3 Claims, 3 Drawing Sheets

SOFT TRANSPARENT POLYETHYLENE RESIN SHEET AND PROCESS FOR PRODUCING THE SAME

TECHNICAL FIELD

The present invention relates to a polyethylene type soft transparent resin sheet and producing method thereof.

BACKGROUND ART

Conventionally, a polyvinyl chloride sheet has been widely used as a resin sheet (or film) having flexibility, heat-resistance, and superior strength. However, the polyvinyl chloride sheet can cause bleedout of a toxic plasticizing agent or monomer during its use and can generate hydrogen chloride when it is burned, which results in environmental problems.

In order to solve the above problems, a sheet having a base of a low-stereoregular polypropylene (Japanese Patent Publication No. Hei 7-119290, Japanese Patent Laid-Open Publication No. Hei 7-171849 etc.) and a sheet having a base of an amorphous polyolefin (Japanese Patent Laid-Open Publication No. Hei 5-77371, Japanese Patent Laid-Open Publication No. Hei 6-218892 etc.) and the like have been proposed. Such sheets are ordinarily produced by a tubular film process, an extrusion process, polishing roller process and the like.

However, the sheet having the base of a low-stereoregular polypropylene does not have as much transparency, glossiness, heat-resistance and stiffness as the polyvinyl chloride sheet.

On the other hand, moldings of the sheet having a base of an amorphous polyolefin produced by either one of the tubular film process and T-die extrusion process are superior in low temperature heat sealability and brittle temperature and sometimes have mechanical characteristics such as rigidity and strength close to the polyvinyl chloride sheet. However, transparency such as gloss and haze comparable to polyvinyl chloride has not been obtained yet.

DISCLOSURE OF THE INVENTION

The polyethylene type soft transparent resin sheet according to a first aspect of the present invention includes layers made of a polyethylene type resin. The polyethylene type soft transparent resin sheet is characterized in having the following characteristics (a to c):

(a) Tensile modulus of 20 to 1000 MPa

When the tensile modulus is smaller than 20 MPa, the sheet is practically less valuable since the stiffness of the sheet is too weak. On the other hand, when the tensile modulus exceeds 1000 MPa, the sheet gets hard and the handling ability deteriorates, thereby making it unsuitable for the desired purpose. Preferably, the tensile modulus is 100 to 800 MPa, more preferably 100 to 600 MPa.

(b) Number of foreign substance having a refractivity different from the amorphous resin composition which occupies a major part of the volume fraction of the sheet being less than or the same as $500/mm^2$ at any cross section of the sheet and average length of the foreign substance being less than or the same as 10 $\mu$m.

One of the major factors for impairing the transparency of the sheet is that incident light is dispersed by the foreign substance. By controlling the number of the foreign substances to be less than or the same as $500/mm^2$ and the average length of the foreign substance to be less than or the same as 10 $\mu$m, the deterioration of the transparency of the sheet can be prevented.

The direction of the cross section is optional and any one of a perpendicular cross section and horizontal cross section relative to the front surface and back surface of the sheet can be used.

The average length refers to the mean value of the longest and shortest length of any cross section of the foreign substance, i.e. a diameter when the foreign substance is a sphere, for instance.

The body of the foreign substance is, for instance, a crystalline phase included in the same resin as the aforementioned amorphous resin composition, a resin different from the aforementioned amorphous resin phase, and an organic substance other than the resins, or inorganic substances (calcium carbonate, talc etc.).

(c) Surface roughness Ra of at least one surface being less than or the same as 0.2 $\mu$m.

One of the major factors for impairing the transparency of the sheet other than the dispersion by the foreign substance is the reflection of the incident light by the surface of the sheet. In other words, when the sheet has concave and convex surfaces, the light is more likely to be reflected in relation to the incident angle of the light, thereby causing so-called irregular reflection. Further, the concave and convex surfaces on the sheet exert a large influence on quality of glossiness. When the surface roughness quantitatively expressed by the center line average roughness Ra is less than 0.2 $\mu$m, the irregular reflection and deterioration in glossiness can be prevented since the concave and convex surfaces on the sheet are largely decreased. More preferably, Ra is less than 0.05 $\mu$m.

The above "soft" word means that the Tensile modulus of the sheet is less than or the same as 1000 MPa. Preferably, the Tensile modulus is less than or the same as 800 MPa, more preferably less than or the same as 600 MPa.

Any layer structure can be adopted for the polyethylene type soft transparent resin sheet. For instance, a single-layered structure or multi-layered structure including a layer made of other types of resin can be used. When the sheet has a multi-layered structure, the content ratio of the polyethylene type resin is preferably more than or the same as 50 wt. %. The multi-layered structure can be made of, for instance, co-extrusion.

The sheet according to the present invention includes a relatively thin film.

The polyethylene type soft transparent resin sheet of the present invention is harmless to the environment since the generation of toxic gas caused in the case of vinyl chloride can be eliminated. Further, since the resin sheet is made of a soft polyethylene type resin, optical characteristics such as transparency, haze and gloss can be improved as well as mechanical strength.

The polyethylene type resin may be a copolymer of ethylene and polar group substituted ethylene.

A specific example of the copolymer of ethylene and polar group substituted ethylene is at least one selected from the group consisting of ethylene-vinyl acetate copolymer (EVA), ethylene-ethylacrylate copolymer (EEA), ethylene-acrylic acid copolymer (EAA), ethylene-methacrylic acid copolymer (EMAA), ethylene methyl acrylate copolymer (EMA), metal ion crosslinking body of ethylene-methacrylic acid copolymer (EMAA) and metal ion crosslinking body of ethylene-acrylic acid copolymer (EAA).

Selected specific resin type and number or the composition ratio thereof can be optionally chosen among the above resin types.

The polyethylene type resin may be an acrylic thermoplastic elastomer.

A second aspect of the present invention is a producing method of a polyethylene type soft transparent resin sheet using a production equipment including a cooling roller and a metal endless member abutting the cooling roller through the resin sheet, the production equipment further having an elastic member opposite to a side of the metal endless member to which the resin sheet is introduced between the cooling roller and the metal endless member to be cooled. The producing method is characterized in having the steps of: introducing the molten polyethylene type soft transparent resin sheet according to the first aspect of the present invention between the cooling roller and the metal endless member so that the resin sheet approximately simultaneously touches the metal endless member and the cooling roller; and sheet-pressing and cooling the soft transparent resin sheet while elastically deforming the elastic member.

The molten resin sheet is, for instance, a resin sheet immediately after being extruded from the die of the extruder.

Fluorine type rubber, silicone type rubber, EPDM, etc. can be used as the material of the elastic member. The thickness of the elastic member is preferably more than or the same as 3 mm for obtaining sufficient areal-pressure by elastic deformation.

The metal endless member and a surface of the roller touching the resin sheet preferably have a mirror-finished surface, which has, for instance, a surface roughness of less than or the same as 0.5 S.

Stainless steel, carbon steel, titanium alloy etc. can be used as a material of the endless member. Though the endless member is of any thickness, a thickness of more than or the same as 0.3 mm is preferable in view of strength.

Since the resin sheet is sheet-pressed and cooled accompanying elastic deformation of the elastic member, the efficiency of cooling and mirror-finished surface transferring can be improved.

Further, pressing and cooling of the resin sheet can be simultaneously conducted by introducing the resin sheet between the cooling roller and the metal endless member so that the resin sheet approximately simultaneously touches the cooling roller and the metal endless belt touching the cooling roller, thereby improving the transparency of the resin sheet. If the resin sheet first touches the metal endless member or the cooling roller, the resin sheet starts being cooled and solidifies before the mirror-finished surface is transferred to both sides of the sheet.

In the present producing method, the metal endless member may be wound around at least two rollers, and the elastic member may be formed on an outer circumference of the cooling roller composing the two rollers.

In other words, the metal endless member is a metal endless belt wound around the at least two rollers in the above arrangement.

Incidentally, a cooling roller or a roller for tension control may be provided in the metal endless belt as well as the two rollers.

In the above producing method, one metal endless member may be wound around the cooling roller to run parallel against the other metal endless member; the molten polyethylene type soft transparent resin sheet according to the present invention may be introduced between the metal endless members to approximately simultaneously touch both of the metal endless members; and the soft transparent resin sheet may be sheet-pressed and cooled while elastically deforming the elastic member.

In other words, the polyethylene type soft transparent resin sheet is sandwiched and cooled by the two metal endless members in the above arrangement.

The elastic member may be formed on an outer circumference of the roller and the metal endless member may be cylindrically formed on an outer circumference of the elastic member.

In other words, the metal endless member is formed as an external layer of the roller in the above arrangement.

The temperature of the metal endless member and the cooling roller directly touching the resin sheet is preferably from dew point to 50° C.

When the temperature of the metal endless member and the roller for cooling the resin sheet is lower than dew point, water-drops are generated on the sheet. On the other hand, when the temperature exceeds 50° C., good transparency cannot be obtained. Preferably, the temperature is below 30° C.

An areal-pressure when the resin sheet is sheet-pressed accompanying elastic deformation of the elastic member is preferably from 0.1 MPa to 20.0 MPa.

When the areal-pressure is lowered below 0.1 MPa, the efficiency for transferring mirror-finished surface and cooling is deteriorated, and when the areal-pressure exceeds 20.0 MPa, tension applied to the endless belt is increased, which is not preferable in view of life span.

The elastic member preferably has a hardness of less than or the same as 95 degrees (based on JIS K6301 A).

When the hardness is larger than 95 degrees, resin banks are likely to be generated on account of weak elasticity when the resin sheet approximately simultaneously touches the cooling roller and the metal endless member. Preferably, the hardness is less than or the same as 70 degrees.

A producing method of polyethylene type soft transparent resin sheet according to third aspect of the present invention uses production equipment having a water tray provided with a slit for flowing cooling water, a water tank located beneath the water tray and a pair of sandwiching rollers disposed in the water tank with at least a portion thereof being sunk in water. The method is characterized in having the steps of: inserting a molten polyethylene type soft transparent resin sheet according to the present invention to the slit to be cooled by the cooling water; and subsequently introducing the resin sheet into the water in the water tank through a gap between the pair of sandwiching rollers.

The temperature of the cooling water is preferably less than or the same as 10° C. Calcium chloride may be added in the water as necessary.

Annealing treatment is preferably conducted to the resin sheet obtained by the above producing method.

The annealing treatment is conducted at a temperature of 80 to 130° C., preferably at 110 to 130° C. The hardness of the sheet surface can be increased by the annealing treatment.

BEST MODE FOR CARRYING OUT THE INVENTION

First Embodiment

Figure 1:
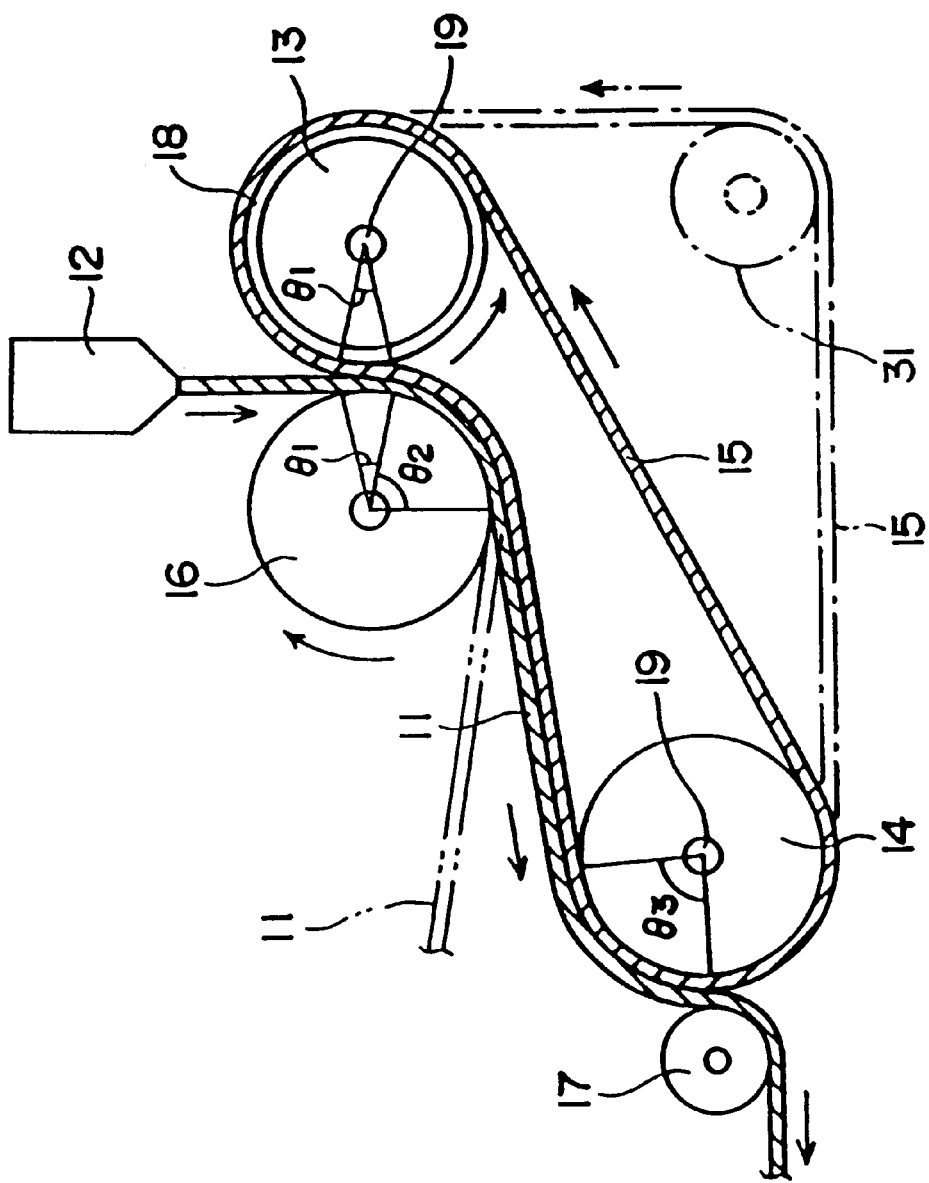
FIG. 1 is a schematic view showing the production equipment used in a producing method of a soft transparent resin sheet according to a first embodiment of the present invention.

A polyethylene type soft transparent resin sheet 11 and a producing method thereof according to the present embodiment will be described below with reference to FIG. 1.

First, an arrangement of the production equipment used in the producing method of the present embodiment will be described.

The production equipment has a T-die 12 of an extruder (not shown), a metal endless belt 15 wound between first cooling roller 13 and second cooling roller 14, third cooling roller 16 to be in contact with the first cooling roller 13 through a resin sheet 11 and the metal endless belt 15, and fourth roller 17 provided adjacent to the second cooling roller 14.

The first cooling roller 13 has an elastic member 18 such as a fluorine type rubber at an outer circumference thereof. The elastic member 18 has a hardness less than or the same as 95 degrees (based on JIS K6301 A) and thickness more than or the same as 3 mm.

The metal endless belt 15 is made of stainless steel, etc. and has a mirror-finished surface having a surface roughness below or the same as 0.5 S.

At least one of the rotational shafts 19 of the first and the second cooling roller 13 and 14 is connected to a rotational driving means (not shown).

The third cooling roller 16 also has a mirror face having a surface roughness less than or the same as 0.5 S. The cooling roller 16 contacts the first cooling roller 13 through the resin sheet 11 and the metal endless belt 15, the cooling roller holding the resin sheet 11 being pressed to the cooling roller 16 side by the endless belt 15. In other words, the metal endless belt 15 and the resin sheet 11 touching the metal endless belt 15 meander winding along a part of the outer circumference of the third cooling roller 16.

The fourth roller 17 guides the resin sheet 11 so that the resin sheet 11 is pressed to the second cooling roller 14 through the endless belt 15.

The first and the third cooling roller 13 and 16 are provided with a temperature controlling means (not shown) such as a water cooling system, for controlling the surface temperature. The temperature controlling means is not provided to the other cooling roller 14, but may also be provided thereto.

Incidentally, as shown by the single dotted line in FIG. 1, an upstream portion of the endless belt 15 to reach the first cooling roller 13 may be cooled in advance by further providing a cooling roller 31 before the first cooling roller 13. The cooling roller 31 also works for controlling the tension of the endless belt 15.

Next, a producing method of the polyethylene type soft transparent resin sheet 11 according to the present embodiment utilizing the above production equipment will be described below.

Initially, the temperature of the respective cooling rollers 13, 14 and 16 is controlled so that the surface temperature of the metal endless belt 15 and the third cooling roller 16 is kept less than or the same as 50° C. and more than or the same as the dew point. Further, pellets composed of a polyethylene type resin are prepared as a material of the resin sheet to be fed to the extruder.

After the material of the resin sheet 11 is thrown into the extruder to be melted and kneaded, the resin sheet 11 extruded from the T-die 12 is introduced between the first and the third cooling rollers 13 and 16 so that the resin sheet 11 approximately simultaneously touches the endless belt 15 touching the first cooling roller 13 and the third cooling roller 16. The resin sheet 11 is pressed by the first and the third cooling rollers 13 and 16 to be cooled below or the same as 50° C. At this time, the elastic member 18 elastically deforms by a pressing force between the first and the third cooling rollers 13 and 16, so that the resin sheet 11 is sheet-pressed by both of the rollers 13 and 16 at an angle θ1 portion from a center of the rollers 13 and 16 where the elastic member 18 is elastically deformed. The areal-pressure at this time is 0.1 MPa to 20.0 MPa.

Subsequently, the resin sheet 11 is pressed to the third cooling roller 16 by the mirror-finished endless belt 15 to be cooled to less than or the same as 50° C. The resin sheet 11 pressed to the cooling roller 16 by the endless belt 15 is held to the cooling roller 16 at an angle θ2 from a center of the cooling roller 16 and is sheet-pressed by the endless belt 15 and the third cooling roller 16 at the holding angle θ2 portion. The areal-pressure at this time is 0.01 MPa to 0.5 MPa.

Next, the resin sheet 11 is moved to the second roller 14 by the rotation of the endless belt 15 while being overlapped with the endless belt 15. The resin sheet 11 is pressed to the second cooling roller 14 through the endless belt 15 to be cooled to less than or the same as 50° C. to be configured into the polyethylene type soft transparent resin sheet 11 according to the present embodiment. When the resin sheet 11 is pressed to the cooling roller 14 being guided by the fourth roller 17, the resin sheet 11 is sheet-pressed through the endless belt 15 at an angle θ3 portion from the cooling roller 14. The areal-pressure at this time is 0.01 MPa to 0.5 MPa.

Incidentally, as shown by the double-dotted line in FIG. 1, the resin sheet 11 may be immediately peeled and drawn off from the endless belt 15 after being cooled by the first and the third rollers 13 and 16.

According to the present embodiment, since the molten resin sheet 11 made from the polyethylene type resin extruded from the T-die 12 is: sheet-pressed and cooled by the first and the third rollers 13 and 16 having elastically deforming elastic member 18 at the angle θ1 portion of both rollers; sheet-pressed and cooled by the metal endless belt 15 and the third cooling roller 16 at the angle θ2 portion; and sheet-pressed and cooled by the endless belt 15 and the second cooling roller 14 at the angle θ3 portion of the second cooling roller 14, the obtained sheet 11 has the following characteristics (a to c).

(a) Tensile modulus of 20 to 1000 MPa;

(b) An average length of a foreign substance having a refractivity different from the amorphous resin composition occupying a major part of volume fraction is less than or the same as 10 μm, and the number offoreign substances within any cross section of the sheet surface is less than or the same as 500/mm$^2$; and (c) Surface roughness of at least one surface is less than or the same as 0.2 μm.

Second Embodiment

Figure 2:
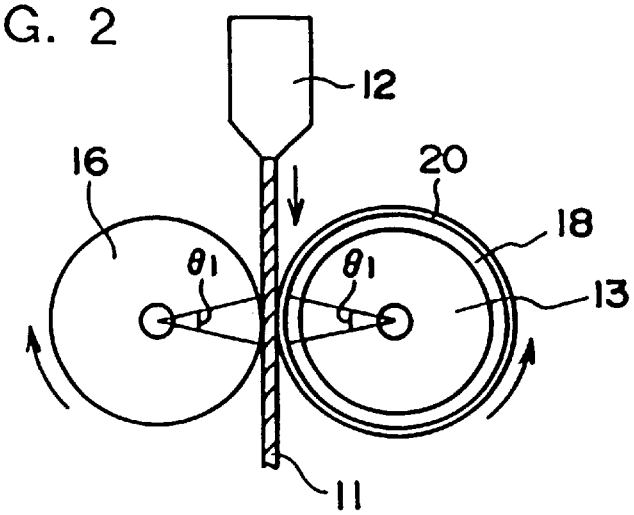
FIG. 2 is a schematic view showing the production equipment used in a producing method of a polyethylene type soft transparent resin sheet according to a second embodiment of the present invention.

The polyethylene type soft transparent resin sheet 11 according to the present embodiment will be described below with reference to FIG. 2.

The production equipment used in the producing method of the present embodiment has a metal endless layer 20 formed on an outer circumference of the elastic member 18 of the first cooling roller 13 as a metal endless member instead of the metal endless belt 15 wound between the first cooling roller 13 and the second cooling roller 14.

According to the producing method using the equipment of the present embodiment, the molten resin sheet 11 composed of the polyethylene type resin material extruded from the T-die 12 is sheet-pressed and cooled by the first and the third rollers 13 and 16 at an angle θ1 portion of the first and the third rollers 13 and 16 where the elastic member 18 elastically deforms, thereby obtaining the sheet 11 having above-mentioned characteristics (a to c).

Third Embodiment

Figure 3:
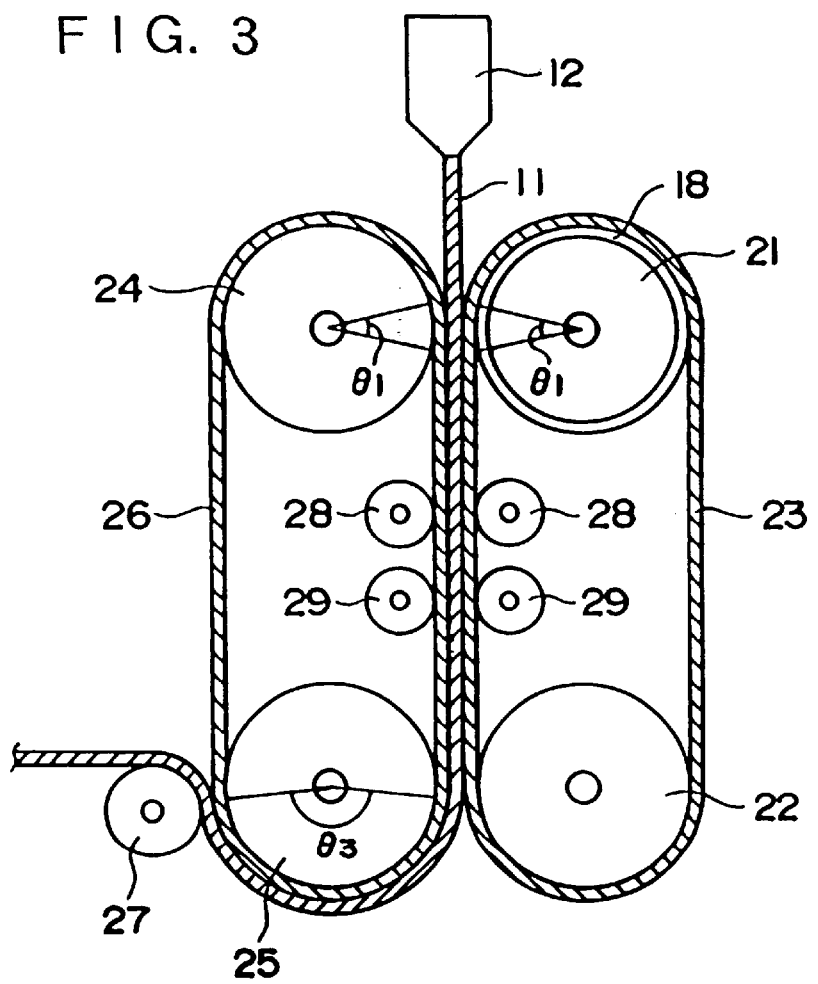
FIG. 3 is a schematic view showing the production equipment used in a producing method of a polyethylene type soft transparent resin sheet according to a third embodiment of the present invention.

Polyethylene type soft transparent resin sheet 11 and producing method thereof according to the present embodiment will be described below with reference to FIG. 3.

Initially, the arrangement of the production equipment used in the present embodiment will be explained.

The production equipment has T-die 12 of the extruder, a metal endless belt 23 wound between first cooling roller 21 and second cooling roller 22, second metal endless belt 26 wound between third cooling roller 24 and fourth cooling roller 25, fifth roller 27 provided adjacent to the fourth cooling roller 25, and two pairs of rollers 28 and 29 provided as a pressing means of the endless belts 23 and 26.

The first cooling roller 21 has an elastic member 18, such as a fluorine type rubber, covering the surface thereof. The elastic member 18 has a hardness (based on JIS K6301 A) of less than or the same as 95 degrees and thickness of more than or the same as 3 mm.

The first and the second metal endless belts 23 and 26 runs parallel sandwiching the polyethylene type soft transparent resin sheet 11 between the first and the second rollers 21 and 22 and the third and the fourth rollers 24 and 25. The endless belts 23 and 26 are respectively made of stainless steel and the like and have mirror-finished surfaces having a surface roughness of less than or the same as 0.5 S.

The two pairs of rollers 28 and 29 as the pressing means oppose each other and sandwich the endless belts 23 and 26 at an approximate intermediate portion of the first and the second rollers 21 and 22 and the third and the fourth rollers 24 and 25. The upper and lower rollers 28 and 29 are spaced apart. Incidentally, the paired respective rollers 28 and 29 need not be opposed but can be shifted with respect to each other.

The fifth roller 27 guides the resin sheet 11 so that the polyethylene type soft transparent resin sheet 11 is pressed to the fourth cooling roller 25 through the second endless belt 26.

The cooling rollers 21, 22, 24 and 25 have a temperature controlling means such as a water cooling system (not shown) for controlling the surface temperature.

Next, the producing method of the polyethylene type soft transparent resin sheet using the above production equipment according to the present embodiment will be described below.

Initially, the temperature of the respective rollers 21, 22, 24 and 25 are controlled so that surface temperature of the metal endless belts 23 and 26 directly touching the polyethylene type soft transparent resin sheet 11 is kept below or the same as 50° C. and above or the same as the dew point.

The polyethylene type soft transparent resin sheet 11 extruded from the T-die 12 of the extruder is introduced between the first and the second endless belts 23 and 26 so that the resin sheet 11 approximately simultaneously touches the first metal endless belt 23 touching the first cooling roller 21 and the second metal endless belt 26 touching the third cooling roller 24, thereby pressing and cooling the polyethylene type soft transparent resin sheet 11 to less than or the same as 50° C. At this time, the elastic member 18 is compressed and elastically deformed by a pressing force between the first and the third cooling rollers 21 and 24, so that the resin sheet 11 is sheet-pressed by the rollers 21 and 24 at the angle θ1 portion from a center of the rollers 21 and 24 where the elastic member 18 is elastically deformed.

Subsequently, the polyethylene type soft transparent resin sheet 11 sandwiched by the endless belts 23 and 26 is pressed and cooled to be less than or the same as 50° C by the two pairs of rollers 28 and 29 as the pressing means at a section where the endless belts 23 and 26 run parallel. The resin sheet 11 sandwiched by the endless belts 23 and 26 between the upper and the lower rollers 28 and 29 are sheet-pressed by the pressing force of the pair of rollers 28 and 29. The areal-pressure at this time is 0.01 MPa to 0.5 MPa.

Next, the polyethylene type soft transparent resin sheet 11 is moved to the second and the fourth cooling roller 22 and 25 by the rotation of the endless belts 23 and 26 and the resin sheet 11 is pressed to the fourth cooling roller 25 through the second endless belt 26 to be cooled to less than or the same as 50° C. The polyethylene type soft transparent resin sheet 11 pressed to the cooling roller 25 is sheet-pressed to the endless belt 26 at the angle θ3 portion from the center of the cooling roller 25 and guided by the fifth roller 27. The areal-pressure at this time is 0.01 MPa to 0.5 MPa.

According to the present embodiment, the sheet 11 having the above-mentioned characteristics (a to c) can be obtained by the sheet-press and cooling of the sheet 11 by the rollers 21 and 24 and endless belts 23 and 26 at the angle θ1 portion of the first and the third rollers 21 and 24, sheet-press and cooling of the sheet 11 by the two pairs of rollers 28 and 29 as the pressing means, and the sheet-press and cooling of the sheet 11 by the second metal endless belt 26 and the fourth cooling roller 25 at the angle θ3 portion.

Fourth Embodiment

Figure 4:
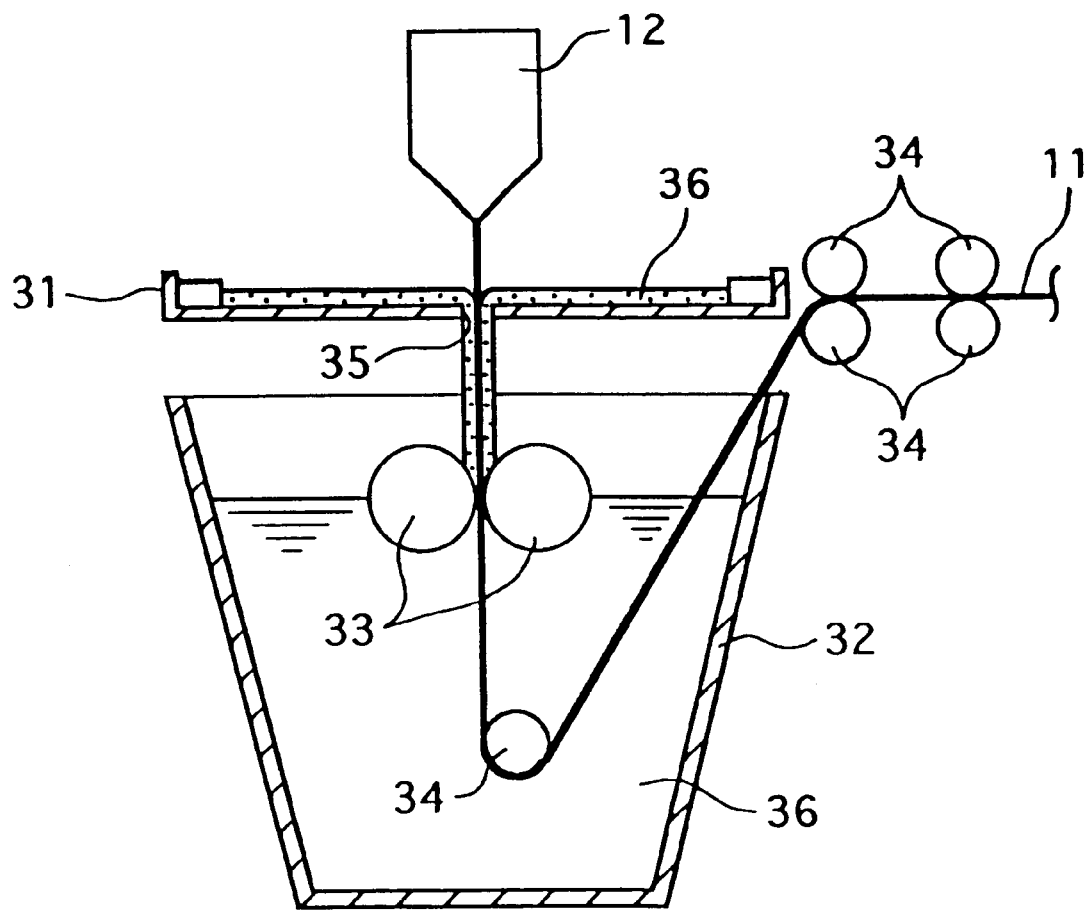
FIG. 4 is a schematic view showing the production equipment used in a producing method of a polyethylene type soft transparent resin sheet according to a fourth embodiment of the present invention.

The polyethylene transparent resin sheet 11 according to the present embodiment will be described below with reference to FIG. 4.

First, the production equipment used in the present embodiment is described below.

The equipment has T-die 12 of an extruder, a water tray 31, a water tank 32 disposed under the water tray 31, and a pair of roller 33 for sandwiching the sheet disposed in the water tank 32. Further, a guide roller 34 for guiding the resin sheet 11 is disposed inside and adjacent to the water tank 32.

The water tray 31 has a slit 35 for flowing cooling water at a center thereof. The slit 35 has a length slightly wider than the width of the resin sheet 11.

The pair of rollers 33 is disposed so that both of the rollers oppose each other and a gap between the rollers 33 is located under the slit 35. The rollers 33 are disposed so that approximately half of the rollers 33 sink into water 36 in the water tank 32.

The polyethylene type soft transparent resin sheet 11 is manufactured using the equipment as follows.

The polyethylene type soft transparent resin sheet 11 extruded from the T-die 12 of the extruder is inserted into the slit 35 and is cooled by the cooling water 36.

Subsequently, the resin sheet 11 is introduced into the water 36 in the water tank 32 through the pair of sandwiching rollers 33 and is drawn out of the water tank 32 through the guide roller 34.

The resin sheet 11 obtained in the above first to fourth embodiments may be processed by annealing. The annealing treatment can be conducted by a heating roller or a belt wound between the heating rollers. The heating roller or the number of heating rollers may be optionally selected.

Alternatively, the resin sheet 11 may be heated and the same processing may be conducted to the molten resin sheet 11 as in the first embodiment.

Experiment 1

In the above first embodiment, the producing method was conducted according to the following specific condition.

Diameter of extruder . . . 90 mm, width of T-die . . . 800 mm

Polyethylene type resin . . . L-LDPE (MI: 1, density: 0.920, Tensile modulus: 430 MPa), MORETEC 0138H (tradename) manufactured by IDEMITSU Petrochemical Co., Ltd.

Thickness of resin sheet . . . 0.2 mm

Material of elastic member . . . silicone type rubber, thickness . . . 12 mm, hardness . . . 55 degrees.

Sheet take-up speed . . . 5 m/min.

Surface temperature of endless belt and roller touching the sheet . . . 15° C.

Experiments 2–16

The resin sheet 11 was manufactured according to the producing method of the embodiment 1 with the composition and weight ratio of the layer being changed as shown in Table 1. Other manufacturing conditions were set equal to Experiment 1.

In Experiment 2, MORETEC 0168N (tradename, manufactured by IDEMITSU Petrochemical Co., Ltd.), a L-LDPE synthesized by a Ziegler type catalyst, was used. The MORETEC 0168N had a MI of 1 g/10 min., density of 0.935 g/cm$^3$ and Tensile modulus of 770 MPa.

In Experiment 3, AFFINITY PL1140 (tradename, DOW CHEMICAL Company) as a metallocene type ethylene-octane copolymer (E-O copolymer) having a long-chain ramification in the main chain was used.

In Experiment 4, AFFINITY PL1880 (tradename, DOW CHEMICAL Company), a metallocene type ethylene-octane copolymer (E-O copolymer) having a long-chain ramification in the main chain, was used.

In Experiment 5, ENGAGE EG-8100 (tradename, DOW CHEMICAL Company), a metallocene type ethylene-octane copolymer (E-O copolymer) having a long-chain ramification in the main chain showing an elastomeric characteristic, was used.

Experiment 6 was a triple-layered sheet. An intermediate layer was a 50 wt. %/50 wt. % combination of butene-1 (40 wt. %)-propylene random copolymer and random propylene, and the front and back layers were the L-LDPE of Experiment 1.

Experiment 7 was a triple-layered sheet. An intermediate layer was an ethylene-ethylacrylate copolymer and the front and back layers were made of IDEMITSU PP F205S (tradename, manufactured by IDEMITSU Petrochemical Co., Ltd.), a homo-polypropylene.

Experiment 8 was a single-layered sheet of ionomer.

Experiment 9 was a triple-layered sheet of L-LDPE/ionomer (IO)/L-LDPE.

Experiment 10 was a double-layered sheet of IO/metallocene type E-O copolymer.

Experiment 11 was a single-layered sheet of ethylene-vinyl acetate copolymer (EVA).

Experiment 12 was a triple-layered sheet of styrene-butadiene-methacrylic acid copolymer (SB)/metallocene type E-O copolymer/SB.

Experiment 13 was a triple-layered sheet of SB/PP/SB.

Experiment 14 was a double-layered sheet of SB/metallocene type E-O copolymer.

Experiment 15 was a single-layered sheet of ethylene-ethylacrylate-maleic anhydride copolymer (E-EA-MAH).

Experiment 16 was a triple-layered sheet of IO/metallocene type E-O copolymer/IO.

Experiment 17

In the second embodiment, the producing method was conducted according to the following specific condition.

Diameter of extruder . . . 90 mm, width of T-die . . . 800 mm

Polyethylene type resin . . . AFFINITY PL1880 as a metallocene type E-O copolymer (tradename DOW CHEMICAL company).

Thickness of resin sheet . . . 0.2 mm

Material of elastic member . . . silicone type rubber, thickness . . . 10 mm, hardness . . . 50 degrees.

Linear pressure between the elastic roller and the first roller . . . 150 N/cm

Sheet take-up speed . . . 5 m/min.

Surface temperature of the roller . . . 15° C.

Experiment 18–23

In Experiment 18, the resin sheet 11 was manufactured using a sheet material of LDPE, MI: 4, density: 0.921, PETROTHEN 190 (tradename) manufactured by TOSOH Corporation, according to the producing method of Experiment 17. Other manufacturing conditions were equal to Experiment 17.

Experiment 19 was a triple-layered sheet of E-EA-MAH/metallocene type E-O copolymer/E-EA-MAH.

Experiment 20 was a triple-layered sheet of L-LDPE/EVA/L-LDPE.

Experiment 21 was a triple-layered sheet of PP/EA/PP.

Experiment 22 was a single-layered sheet of ethylene-methacrylic acid copolymer (EMAA).

Experiment 23 was a double-layered sheet of L-LDPE/EVA.

Experiment 24–31

In the above third Embodiment, the composition of the layer was defined as follows. The specific producing conditions were equal to Experiment 1.

Experiment 24 was a triple-layered sheet of PP/E-EA-MAH/PP.

Experiment 25 was a triple-layered sheet of LL/EMAA/LL.

Experiment 26 was a triple-layered sheet of EMAA/metallocene type E-O copolymer/EMAA.

Experiment 27 was a triple-layered sheet of PP/EAA/PP.

Experiment 28 was a triple-layered sheet of PP/EMAA/PP.

Experiment 29 was a triple-layered sheet of PP/IO/PP.

Experiment 30 was a triple-layered sheet of PP/ethylene methyl acrylate copolymer (EMA)/PP.

Experiment 31 was a double-layered sheet of EMAA/metallocene type E-O copolymer.

Experiment 32 and 33

In the above fourth embodiment, the composition of the layers was defined as follows. The specific producing conditions were equal to Experiment 1. The temperature of the cooling water 36 was 6° C.

Experiment 32 was a triple-layered sheet of PP/IO/PP.

Experiment 33 was a single-layered sheet of EMAA.

Comparison 1 and 2

A resin sheet was produced according to a conventional touch-roller type sheet forming method using a cooling roller. The temperature of the cooling roller was 40° C.

The same resin as Experiment 1 was used in Comparison 1.

Comparison 2 was a triple-layered sheet of PP/metallocene type E-O copolymer/PP.

The same layer arrangement and resin as in Experiment 6 was used in Comparison 3.

Evaluation of Characteristics

Surface roughness (on one side of the sheet and the other side), haze (total haze/internal haze), gloss and Tensile modulus were measured on the resin sheets obtained in Experiments 1 to 33 and Comparison 1 to 3. The results are shown in Tables 1 to 4.

The surface roughness was measured using an electron-beam three-dimensional roughness analyzer (ERA-4000 manufactured by ELIONIX Corp.).

The haze was calculated by the following formula according to a ratio of total light transmittance (Tt) showing the entirety of the beam transmitted through the sheet after irradiating the beam onto the sheet and diffused light transmittance (Td) showing the light beam diffused and transmitted through the sheet using a haze measuring machine (for instance, NDH-300A manufactured by NIPPON DENSHOKKU KOGYO Co., Ltd.). The total light transmittance (Tt) is a sum of the parallel light transmittance (Tp) transmitting coaxially with the irradiated light and the diffused light transmittance (Td).

Haze (H)=Td/Tt×100

The total haze was calculated by Td and Tt obtained by irradiating a light beam onto the sheet. The internal haze was measured after coating silicone oil on both sides of the sheet and sandwiching the sheet with glass plates to eliminate the influence by the outside of the sheet.

Total haze=internal haze+external haze

The gloss was obtained as follows by measuring a reflected light flux φs after irradiating a light beam onto the sheet at an entry angle of 60 degrees and receiving the light beam at the same 60 degrees using an automatic calorimetric color-difference meter (AUD-CH-2Type-45, 60 manufactured by SUGA SHIKENKI Co., Ltd., for example) according to a ratio against a reflected light flux φos from a glass surface having a refractivity of 1,567.

Gloss (Gs)=(φs/φos)×100

The Tensile modulus was measured based on JIS K-7113.

TABLE 1

| | Layer Composition and Weight Ratio (wt %) | Embodiment | Thickness (μm) |
|---|---|---|---|
| Experiment 1 | L-LDPE | First | 200 |
| Experiment 2 | L-LDPE | First | 200 |
| Experiment 3 | E-O | First | 200 |
| Experiment 4 | E-O | First | 300 |
| Experiment 5 | E-O | First | 200 |
| Experiment 6 | LL(35)/B1-PP(30)/LL(35) | First | 300 |
| Experiment 7 | PP(10)/EEA (80) /PP(10) | First | 200 |
| Experiment 8 | IO | First | 300 |
| Experiment 9 | LDPE(33)/IO/LDPE(33) | First | 200 |
| Experiment 10 | IO(10)IE-O | First | 250 |
| Experiment 11 | EVA | First | 200 |
| Experiment 12 | SB(10)/E-O/SB(10) | First | 300 |
| Experiment 13 | SB(10)/PP/SB(10) | First | 300 |
| Experiment 14 | SB(10)/E-O | First | 300 |
| Experiment 15 | E-EA-MAH | First | 200 |
| Experiment 16 | IO(10)/E-O/IO(10) | First | 250 |
| Experiment 17 | E-O | Second | 200 |
| Experiment 18 | LDPE | Second | 200 |
| Experiment 19 | E-EA-MAH(10)/E-O/E-EA-MAH(10) | Second | 200 |
| Experiment 20 | LL(10)/EVA/LL(10) | Second | 200 |
| Experiment 21 | FP(10)/EEA/PP(10) | Second | 300 |
| Experiment 22 | EMAA | Second | 200 |
| Experiment 23 | LL(10)/EVA | Second | 200 |
| Experiment 24 | PP(10)/E-EA-MAH/PP(10) | Third | 200 |
| Experiment 25 | LL(10)/EMAA/LL(10) | Third | 250 |
| Experiment 26 | EMAA(10)/E-O/EMAA(10) | Third | 150 |
| Experiment 27 | PP(10)/EAA/PP(10) | Third | 200 |
| Experiment 28 | PP(10)/EMAA/PP(10) | Third | 300 |
| Experiment 29 | PP(10)/IO/PP(10) | Third | 300 |
| Experiment 30 | PP(10)/EMA/PP(10) | Third | 200 |
| Experiment 31 | EMAA(10)/E-O | Third | 150 |
| Experiment 32 | PP(10)/IO/PP(10) | Fourth | 300 |
| Experiment 33 | EMAA | Fourth | 200 |

TABLE 2

| | Surface Roughness (Ra) | | Total haze | Internal Haze | Gloss | Tensile modulus (MPa) |
|---|---|---|---|---|---|---|
| | One Side | The Other Side | | | | |
| Experiment 1 | 0.036 | 0.028 | 5.0 | 3.0 | 120 | 200 |
| Experiment 2 | 0.033 | 0.036 | 5.0 | 3.0 | 120 | 770 |
| Experiment 3 | 0.037 | 0.032 | 2.5 | 0.8 | 120 | 80 |
| Experiment 4 | 0.035 | 0.039 | 3.0 | 1.5 | 120 | 90 |
| Experiment 5 | 0.042 | 0.038 | 1.0 | 0.5 | 130 | 80 |
| Experiment 6 | 0.038 | 0.035 | 5.0 | 2.5 | 110 | 120 |
| Experiment 7 | 0.035 | 0.030 | 1.0 | 0.3 | 130 | 170 |
| Experiment 8 | 0.033 | 0.035 | 2.0 | 0.2 | 120 | 100 |
| Experiment 9 | 0.031 | 0.034 | 1.7 | 0.17 | 110 | 300 |
| Experiment 10 | 0.034 | 0.038 | 2.3 | 0.5 | 120 | 100 |
| Experiment 11 | 0.031 | 0.032 | 1.5 | 0.4 | 110 | 100 |
| Experiment 12 | 0.035 | 0.038 | 2.3 | 1.2 | 110 | 200 |
| Experiment 13 | 0.039 | 0.031 | 3.0 | 1.3 | 110 | 500 |
| Experiment 14 | 0.032 | 0.038 | 4.0 | 1.5 | 110 | 200 |
| Experiment 15 | 0.036 | 0.032 | 2.0 | 0.5 | 120 | 100 |
| Experiment 16 | 0.035 | 0.038 | 1.3 | 0.6 | 110 | 100 |
| Experiment 17 | 0.038 | 0.035 | 3.0 | 1.5 | 120 | 90 |
| Experiment 18 | 0.036 | 0.037 | 3.0 | 1.7 | 120 | 140 |

TABLE 2-continued

| | Surface Roughness (Ra) | | | | | Tensile |
|---|---|---|---|---|---|---|
| | One Side | The Other Side | Total haze | Internal Haze | Gloss | modulus (MPa) |
| Experiment 19 | 0.033 | 0.031 | 2.0 | 1.0 | 110 | 200 |
| Experiment 20 | 0.035 | 0.037 | 3.0 | 1.2 | 120 | 100 |
| Experiment 21 | 0.038 | 0.032 | 3.0 | 1.2 | 110 | 100 |
| Experiment 22 | 0.039 | 0.038 | 3.0 | 1.2 | 110 | 200 |
| Experiment 23 | 0.037 | 0.032 | 2.0 | 1.3 | 120 | 100 |
| Experiment 24 | 0.039 | 0.030 | 3.0 | 0.9 | 120 | 100 |
| Experiment 25 | 0.033 | 0.036 | 2.0 | 1.1 | 110 | 100 |
| Experiment 26 | 0.032 | 0.035 | 2.0 | 1.0 | 110 | 100 |
| Experiment 27 | 0.033 | 0.039 | 3.0 | 1.1 | 120 | 300 |
| Experiment 28 | 0.038 | 0.037 | 3.0 | 1.3 | 120 | 300 |
| Experiment 29 | 0.034 | 0.032 | 3.5 | 1.2 | 120 | 300 |
| Experiment 30 | 0.036 | 0.033 | 4.0 | 1.5 | 120 | 300 |
| Experiment 31 | 0.032 | 0.038 | 2.0 | 1.0 | 110 | 200 |
| Experiment 32 | 0.036 | 0.033 | 3.5 | 1.5 | 120 | 300 |
| Experiment 33 | 0.034 | 0.033 | 2.0 | 1.0 | 110 | 200 |

The abbreviation and specific goods are as follows.

EVA: ethylene-vinyl acetate copolymer, ULTRATHEN 630 (tradename) manufactured by TOSOH Corporation EEA: ethylene-ethylacrylate copolymer, EVAFLEX A701 (tradename) manufactured by DU PONT-MITSUI POLYCHEMICALS CO., LTD.

EAA: ethylene-acrylic acid copolymer, PRIMACOR 3300 (tradename) manufactured by DOW CHEMICAL Company EMAA: ethylene-methacrylic acid copolymer, NUCREL N0903HC (tradename) manufactured by MITSUI DUPONT EMA: ethylene-methyl acrylate copolymer, SP2205 (tradename) manufactured by CHEVRON E-EA-MAH: ethylene-ethylacrylate maleic anhydride copolymer, ADTEX ET184 (tradename) manufactured by JAPAN POLYOLEFINS CO., LTD.

SB: styrene-butadiene methacrylic acid copolymer, SB polymer (tradename) manufactured by KURARAY Co., Ltd.

E-O: metallocene type ethylene-octane copolymer, AFFINITY PL1140 (tradename, Experiment 3) AFFINITY PL1880 (tradename, Experiments 10, 12, 14, 16, 19, 26, 31) manufactured by DOW CHEMICAL Company PP: random polypropylene, F-744NP (tradename) manufactured by IDEMITSU Petrochemical Co., Ltd.

LDPE: low-density polyethylene, PETROTHEN 207 (tradename, Experiment 9), PETROTHEN 190 (tradename, Experiment 18) manufactured by TOSOH Corporation LL: linear low-density polyethylene, MORETEC 0138H (tradename, Experiment 1), MORETEC 0168N (tradename, Experiment 2), MORETEC V-0398CN (tradename, Experiment 20, 23, 25) manufactured by IDEMITSU Petrochemical Co., Ltd.

TABLE 3

| | Layer Composition and Weight Ratio (wt %) | Embodiment | Thickness ($\mu$m) |
|---|---|---|---|
| Comparison 1 | L-LDPE | First | 200 |
| Comparison 2 | PP(10)/E-O(80)/PP(10) | First | 200 |
| Comparison 3 | PP(35)/B1-PP(30)/PP(35) | First | 200 |

TABLE 4

| | Surface Roughness (Ra) | | | | | Tensile |
|---|---|---|---|---|---|---|
| | One Side | The Other Side | Total haze | Internal Haze | Gloss | modulus (MPa) |
| Comparison 1 | 0.5 | 0.4 | 15.0 | 6.0 | 80 | 400 |
| Comparison 2 | 0.5 | 0.6 | 15.0 | 4.0 | 80 | 350 |
| Comparison 3 | 0.5 | 0.7 | 18.0 | 5.0 | 80 | 300 |

As shown in Tables 1 and 2, since the single-layered or multi-layered molten resin sheet 11 manufactured from polyethylene type resin material extruded from an extruder was cooled and solidified by the production equipment in the Experiments 1 to 3, the obtained resin sheet 11 had the above a, b and c characteristics.

Further, when the number of foreign substance (per 1 mm$^2$) and average length were measured by the naked eye using a phase-contrast microscope, the number remained 100 to 400/mm$^2$ and the average length was kept within a range of 1 to 5 $\mu$m.

Accordingly, it can be observed that the resin sheet 11 of the respective Experiments had a good transparency with low total haze and internal haze, and good glossiness with high gloss. Further, the resin sheet 11 had much flexibility with a low Tensile modulus.

On the other hand, as shown in Tables 3 and 4, though the material of Comparisons 1 to 3 were the same as each of the Experiments, the obtained resin sheet had a surface roughness out of the range of the present invention since the resin sheet was produced by the touch-roll type sheet forming method. The number of the foreign substances was less than 500/mm$^2$ observed by the naked eye using the phase-contrast microscope, except for Comparison 1. Further, the average length of the foreign substance was 13 $\mu$m in Comparison 2, and 12 $\mu$m in Comparison 2.

Accordingly, the resin sheet of the Comparisons was inferior in transparency with a high total haze and internal haze and had a bad glossiness with a low gloss. Further, the resin sheet had a low flexibility with a high Tensile modulus.

INDUSTRIAL AVAILABILITY

The sheet obtained in the present invention can be used for packaging foods, medicine, clothing, etc. The sheet can also be used for stationery goods (pen case, stationery case, etc.), decorative sheets (building interior and exterior material, furniture and the like), portable bags (fashion bag, traveling article bag), agricultural greenhouse covers, table cloths, desk mats, partitions, door curtains or the like.

What is claimed is:

1. A polyethylene transparent resin sheet having a layer including a polyethylene resin formed from a copolymer of ethylene and polar group substituted ethylene, characterized in having the following characteristics:

(a) tensile modulus of 20 to 1000 MPa;

(b) number of foreign substances having a refractivity different from an amorphous resin composition which occupies a major part of a volume fraction of the sheet is no greater than 500/mm$^2$ at any cross-section of the sheet and the foreign substances have an average length of no more than 10 $\mu$m; and (c) surface roughness, Ra, of at least one surface being no greater than 0.2 $\mu$m.

2. A polyethylene transparent resin sheet having a layer including a polyethylene resin formed from an acrylic thermoplastic elastomer, characterized in having the following characteristics:

(a) tensile modulus of 20 to 1000 MPa;
(b) number of foreign substances having a refractivity different from an amorphous resin composition which occupies a major part of a volume fraction of the sheet is no greater than 500/mm² at any cross-section of the sheet and the foreign substances have an average length of no more than 10 μm; and
(c) surface roughness, Ra, of at least one surface being no greater than 0.2 μm.

3. The polyethylene transparent resin sheet according to claim 1, wherein the copolymer of ethylene and polar group substituted ethylene is at least one selected from the group consisting of ethylene-vinyl acetate copolymer (EVA), ethylene-ethylacrylate copolymer (EEA), ethylene-acrylic acid copolymer (EAA), ethylene-methacrylic acid copolymer (EMAA), ethylene methyl acrylate copolymer (EMA), metal ion crosslinked body of ethylene-methacrylic acid copolymer (EMAA) and metal ion crosslinked body of ethylene-acrylic acid copolymer (EAA).

* * * * *